Dec. 11, 1951          F. A. LYON          2,577,785
                    COMPUTING GUN SIGHT
Filed July 28, 1944                    7 Sheets—Sheet 1

INVENTOR
FLOYD A. LYON
BY Herbert H. Thompson
his ATTORNEY.

Dec. 11, 1951          F. A. LYON          2,577,785
COMPUTING GUN SIGHT Filed July 28, 1944          7 Sheets—Sheet 4

INVENTOR
FLOYD A. LYON
BY
his ATTORNEY

Dec. 11, 1951   F. A. LYON   2,577,785
COMPUTING GUN SIGHT
Filed July 28, 1944   7 Sheets-Sheet 5

INVENTOR
FLOYD A. LYON
BY Herbert H. Thompson
his ATTORNEY.

Dec. 11, 1951     F. A. LYON     2,577,785
COMPUTING GUN SIGHT
Filed July 28, 1944     7 Sheets-Sheet 6

FIG.10

INVENTOR
FLOYD A. LYON
BY
Herbert P. Thompson
ATTORNEY

Dec. 11, 1951          F. A. LYON          2,577,785

COMPUTING GUN SIGHT

Filed July 28, 1944          7 Sheets-Sheet 7

INVENTOR
FLOYD A. LYON
BY
*Herbert R. Thompson*
his ATTORNEY

Patented Dec. 11, 1951

2,577,785

UNITED STATES PATENT OFFICE 2,577,785

COMPUTING GUN SIGHT

Floyd A. Lyon, Elmhurst, N. Y., assignor to The Sperry Corporation, a corporation of Delaware Application July 28, 1944, Serial No. 547,055

8 Claims. (Cl. 33—49)

This invention relates to a computing sight and more particularly to gun sights of the kind in which the line of sight defining means is automatically displaced with respect to the bore of the gun during target tracking operations according to prediction angles computed by the sight mechanism.

An object of the invention is the provision of a more accurate sight at reduced cost, size and weight.

Another object is the provision of a compact computing and sighting unit which may be attached easily to existing turret gun installations without appreciably crowding the turret.

A further object of the invention is to provide a sight having a simplified mechanism designed to make maximum use of die-cast parts thereby reducing the manufacturing cost of the device and accelerating production.

A still further object is to provide a sight composed of a number of independently assembled units so designed as to be interconnected easily in final assembly without the need for further machining or adjustment.

Other objects of the invention will appear in the following description given with the aid of the accompanying drawings, of which.

The mechanism of the sight is enclosed in a casing for mounting on any suitable support which will permit the sight to be moved for target tracking purposes. It will be understood that the sight may be used in the known manner for the remote control of a gun. Due to its small size, however, the sight may be directly mounted by means of a suitable adapter on the guns in any existing turret, and the description of sight will be directed to the arrangement whereby the sight is mounted on, or between a pair of guns, the computing mechanism of the sight being driven by the movements of the gun or a gun turret in elevation and azimuth.

Known computing sights have utilized data obtained from movements of the gun in various ways in combination with various ballistic functions to obtain desired prediction angles. Generally speaking, former structures having comparable accuracy were heavy and bulky consisting of numerous cams, differentials and variable speed units, all of which were of precision construction, expensive and slow to manufacture and assemble. Due to the novel construction of the sight of the present invention only three three-dimension cams, two differential units and three variable speed drives are required, in addition to some intermediate mechanism consisting principally of levers, yet the sight automatically calculates ballistic deflections corrected for range, indicated air speed, altitude, gun azimuth and gun elevation. The time of flight, which is used for prediction, is corrected for range and altitude.

The casing which encloses the sight mechanism has a number of irregularly shaped castings attached thereto provided with bearings of various kinds for the respective units of the sight mechanism which will be referred to as the description of the device progresses.

Figure 1:
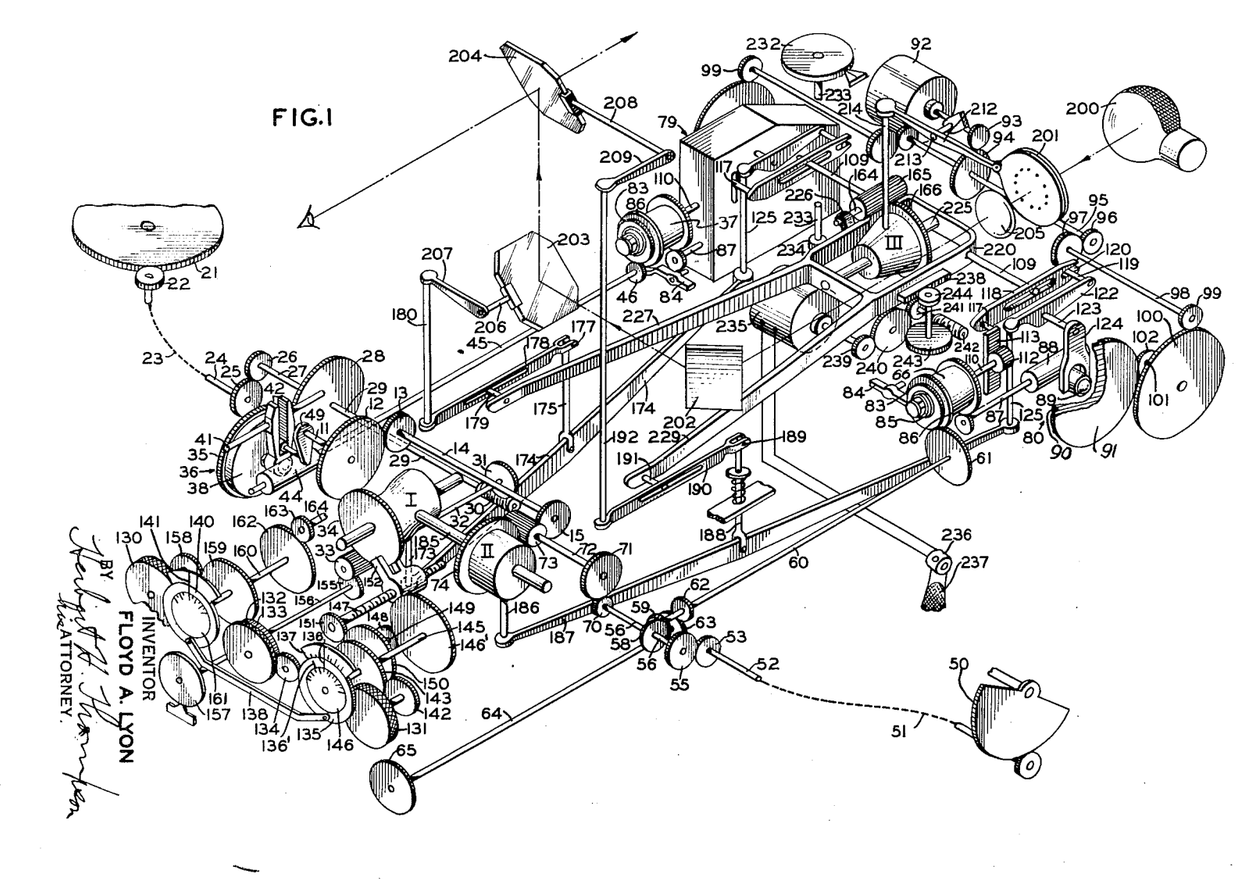
Fig. 1 is a schematic drawing of the sight mechanism.

During a target tracking operation the motion of the gun or turret is transmitted to the sight in any convenient manner. In Fig. 1 an azimuth gear 21 attached to the gun or turret drives a gear 22 of a flexible cable 23 connected by shaft 24 to gear 25 shown also in Fig. 2 inside sight casing 20. Gear 25 drives gear 26 connected by shaft 27 to gear 28 coupled by shaft 29 to worm 30 which drives worm gear 31 connected by shaft 32 to long pinion 33 meshed with gear 34 for rotating three dimension cam I in proportion to the angular rate of the gun in azimuth. This cam will be referred to again further on.

Figure 2:
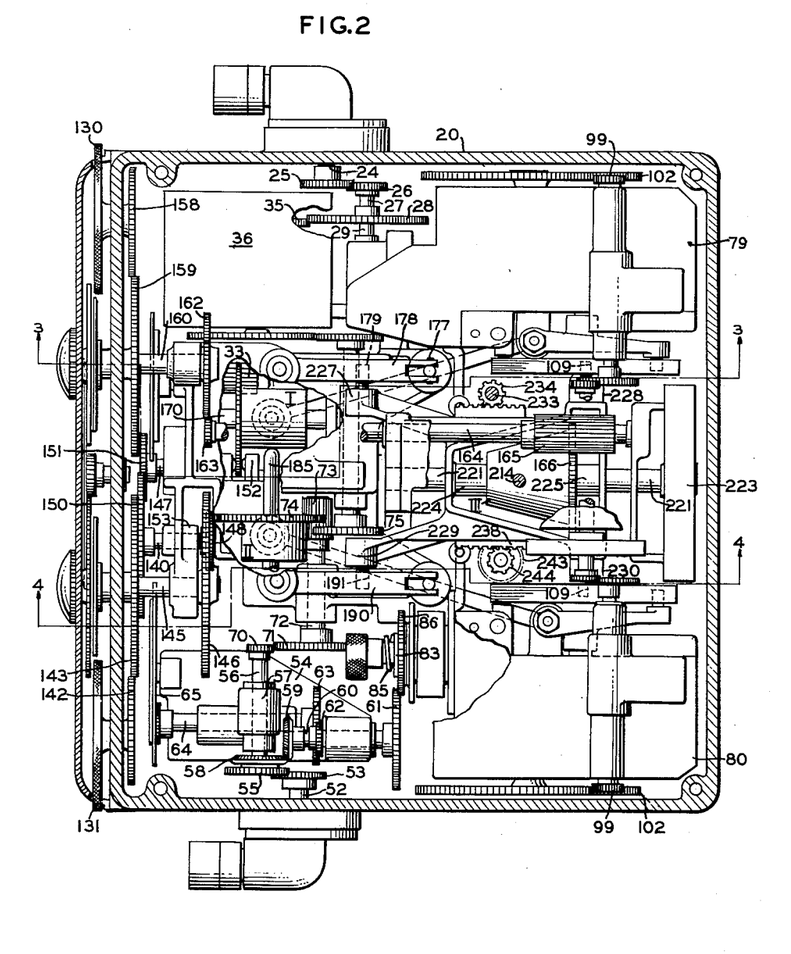
Fig. 2 is a plan view of the computing mechanism partly in section as it appears when the cover of the enclosing casing is removed.
Figure 5:
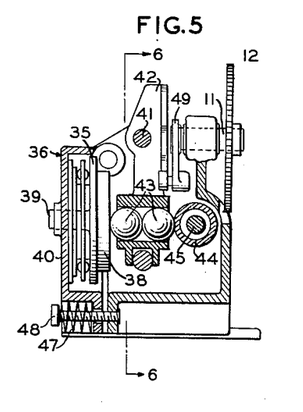
Fig. 5 shows a variable speed drive unit in transverse section.
Figure 6:
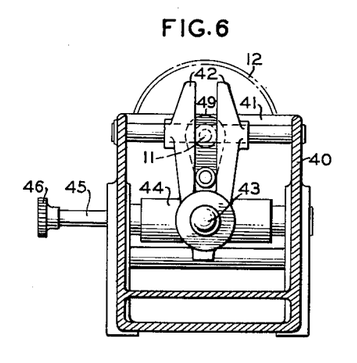
Fig. 6 shows the variable speed drive unit in section, the section being taken through 6—6 of Fig. 5.

Gear 28 drives gear 35 of a variable speed device 36 shown also in Figs. 2, 5 and 6. The parts of the variable speed device are supported by an independent framework 40 so designed that it may be inserted into the machine as a unit and coupled with the rest of the mechanism without altering the position of interconnecting members. This arrangement provides a more compact structure and simplifies assembling of the device.

Gear 35 is formed integrally with disc 38 of the constant speed device and its shaft 39 turns in a bearing in the framework 40. A horizontal shaft 41 secured between opposite sides of framework supports for sliding movement the bifurcated arms 42 of a ball carriage which carries a pair of balls 43 disposed between disc 38 and a roller 44 supported by bearings in opposite sides of framework 40. A shaft 45 attached to the roller and projecting through the frame carries a gear 46 that drives one arm of a differential unit 37, Fig. 1, which will be described further on. A spring 47 and an adjustment screw 48 therefor are provided to maintain pressure between the roller, balls and disc in the usual manner. The ball carriage is displaced in the known manner in proportion to the cosine of the gun elevation angle rate (cos GE) to convert azimuth velocity, to velocity in a slant plane, by a crank 49, having an arm positioned between the arms 42 of the ball carriage. The crank is mounted on shaft 11 driven from the elevation input mechanism described below, by gears 12 and 13, shaft 14, the latter carrying gear 15 in mesh with the long pinion 73 of the gun elevation input mechanism. The output of the variable speed unit is a diplacement of shaft 45 proportional to the product of the gun azimuth rate GA and cos GE which is the displacement of the line of sight in a plant plane.

The gun or gun turret movement in elevation may be communicated to the sight in any desired manner, the usual arrangement, shown in Fig. 1, consists of a sector 50 which drives a gear connected by a flexible shaft 51, and a shaft 52 to gear 53 inside of the sight casing. Gear 53 is the input for an elevation gear unit, Fig. 2, which consists of a supporting casting having a base 54 on which is formed a number of upright members provided with bearings for several shafts. The unit is so arranged that the gears and shafts may be separately assembled thereon and the whole assembly thereafter inserted into the casing, the respective driving and driven members of the unit fitting in with other interconnecting members without adjustment.

Figure 10:
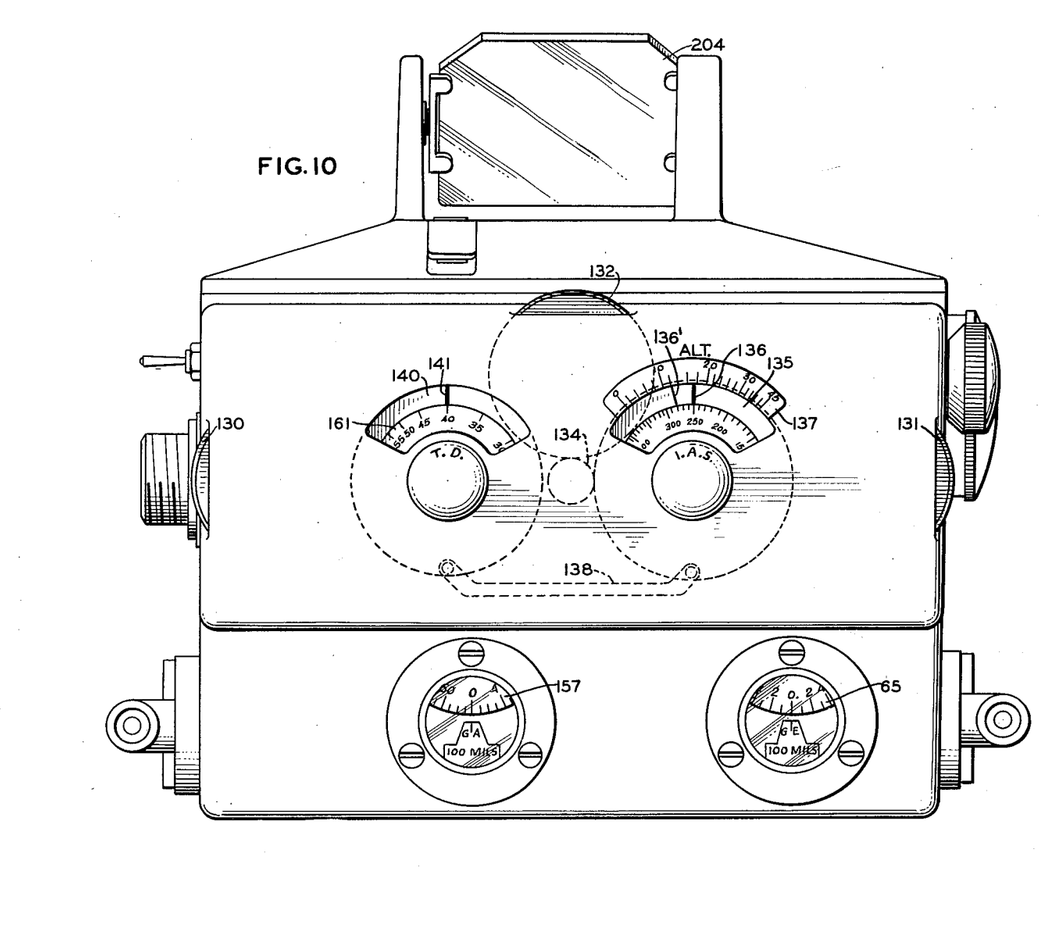
Fig. 10 is a view of the sight in elevation.

Gear 53 is in mesh with a gear 55 secured to shaft 56 supported in a bearing in upright member 57 of the elevation input unit casting. Shaft 56 through bevel gears 58 and 59 drives a shaft 60 carrying a gear 61 which meshes with an input gear of a differential 66. Gear 62 on shaft 60 drives gear 63 and shaft 64 which turns a gun elevation dial 65 that can be observed through a window in the front of the case as shown in Fig. 10.

Shaft 56 also carries a gear 70 which through gear 71 and shaft 72 drives a long pinion 73 that turns elevation ballistic cam II by means of gear 74 formed at the end of the cam.

Gear 46 of the azimuth mechanism and gear 61 of the elevation mechanism as already decribed each drive an input member of an individual equating differential. These differentials 37 and 66 are parts of the respective constant speed drive rate equating mechanisms 79 and 80 which are alike except that they bear right and left hand relationship to each other. The mechanisms are used for computing prediction angle rates.

Figure 8:
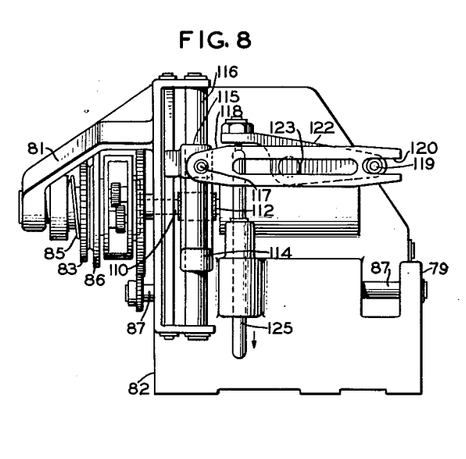
Figs. 8 and 9 show details in plan and section, respectively, of a variable speed mechanism.
Figure 9:
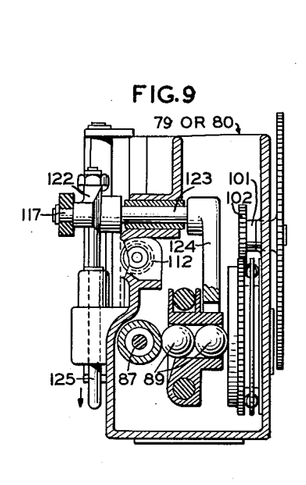

In Fig. 1 unit 79 associated with gun azimuth (shown near the top of the sheet) is represented as being partially enclosed in a framework while the corresponding unit 80 associated with gun elevation is shown with the framework omitted to give a better understanding of the device. Figs. 8 and 9 show details of the mechanism of the multiplier unit 79. Each unit 79 and 80 comprises a differential supported by an arm 81 and the frame 82. Gear 83 of the differential 37 is driven by gear 46, while gear 61 on the other side of the machine drives the corresponding element of the differential 66 for rate equating member 80. Associated with each differential, is a clutch controlled by member 84 operated by known means which are not part of the present invention for disconnecting the sight mechanism according to known practice, when the gun position is being rapidly shifted. The clutch is indicated by spring 85 and friction disc 86.

Referring to Fig. 1, the shafts 87 of the differentials are connected to the associated drum 88 of the variable speed device rotated by balls 89 of a ball carriage which are driven by disc 90 coupled to gear 91 driven at a constant speed by constant speed motor 92. Gears 91 of the respective units are driven from the constant speed motor by a gear and cross shaft mechanism including gear 93 on the motor shaft which drives gear 94, shaft 95, meshed gears 96 and 97, shaft 98, gears 99 and 100, shaft 101, and finally gear 102 which is in mesh with gear 91.

The ball carriages of the units 79 and 80 are displaced by a bell crank and lever mechanism positioned variably from shaft 110 of the differential in accordance with the position of fulcrum studs 109 carried by a framework which supports a range cam III. The framework moves with the range cam in translation and positions the fulcrums accordingly in a horizontal plane, the variably positioned fulcrums being used to introduce a time of flight function of range into the respective multipliers to delay the action thereof for the purpose of stabilizing the sight to prevent too great an initial offset to the optics when the sight is rapidly slewed in overtaking a target. The time lag does not affect the magnitude of the prediction deflection. Irrespective of the position of the variable pivot 109, it will require a certain ball carriage displacement to equate the gun elevation (GE) rate or the gun azimuth × cosine gun elevation rate (GA × cos GE). The speed of equating these rates, however, will be inversely proportional to time of flight.

Output shaft 110 of the differential turns in a bearing in framework 82 for the constant speed multiplier and inside of the casing framework, Fig. 8, the shaft carries a gear 112, Fig. 1, in mesh with rack 113 supported by members 114 and 115 which slide on a vertical member 116 supported by the framework of the unit. The rack is connected with a pin 117 that projects outward through a slot in the framework where it is pivoted into the end of lever 118 of a multiplying linkage. The opposite end of lever 118 is supported by a pin 119 projecting into an open slot 120 formed therein. The fulcrum of lever 118 is stud 109 carried by the range cam framework. Pin 119 is supported at the end of a second lever 122 secured to a shaft 123 so that the shaft turns with the lever. Shaft 123 is pivoted in a bearing in the framework of the unit and its inner end carries a depending bifurcated member 124 which turns with the shaft. The depending arms of member 124 engage opposite ends of a ball carriage for balls 89, the coupled arrangement of lever 122, shaft 123 and bifurcated member 124 being equivalent mechanically to a bell crank which is used to move the ball carriage.

Lever 122 engages the upper end of a pin 125 supported for vertical reciprocation in a bearing formed on the outside of framework 82. The lower end of the pin imparts the movement of lever 122 to an adding linkage. This movement represents the lateral or vertical prediction rates computed by the respective multiplying mechanisms.

In operation, the input drive from either gear 46 or 61 of the respective multipliers displaces the associated shaft 110 and rack 113. Lever 118 is rocked on its fulcrum stud 109 which is displaced with range cam 111 along a horizontal plane as a time of flight function of range. The movement of the lever is communicated to the bell crank arm 124 which displaces the ball carriage along driving drum 88 which turns an input gear of the differential until the ball carriage is displaced to a position of equilibrium where the rate input from the turret in gun elevation or gun azimuth is balanced with that of the drum. This displacement as already described is communicated to pin 125 and the adding linkage. The displacement of the pin 125 associated with unit 80 represents a vertical prediction deflection divided by a function of the time of flight, while that of the pin 125 of multiplier 79 represents a lateral prediction deflection divided by a function of the time of flight as will be explained in greater detail later on.

In Fig. 10 portions of three knurled discs are shown partly projecting through the sight casing. These discs are conveniently located so that they can be turned by the thumbs of an operator. Discs 130 and 131 are used respectively for setting target dimensions and indicated air speed into the sight mechanism. Disc 132 is used to adjust the mechanism for altitude.

Disc 132 is shown in Fig. 1 coupled to a gear 133 in mesh with an idler gear 134 which turns a ring 135 carrying a lubber line 136 that cooperates with a stationary scale 137 having graduations which represent the altitude factor function on a logarithmic scale. The lubber line is positioned by disc 132 in alignment with the altitude value of scale 137. Ring 135 is coupled by link 138 to a similar ring 140 carrying lubber line 141 for the target dimension scale. Movement of ring 135 effects through the link a similar movement of ring 140.

Indicated air speed disc 131 is secured to a gear 142 which meshes with a gear 143, Fig. 2, on shaft 145 that turns IAS dial 146 associated with ring 135 and lubber line 136. Dial 146 is graduated to represent the IAS factor function on a logarithmic scale. Disc 131 is adjusted to align the appropriate air speed value of dial 146 with the lubber line.

Figure 3:
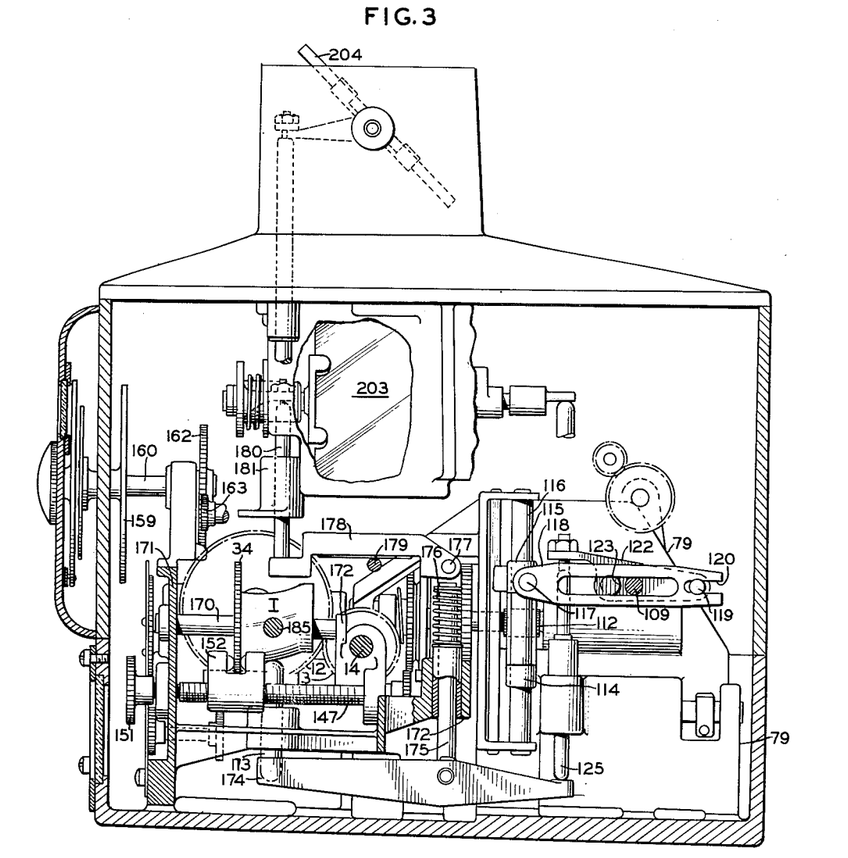
Fig. 3 is a vertical section taken through 3—3 of Fig. 2.
Figure 4:
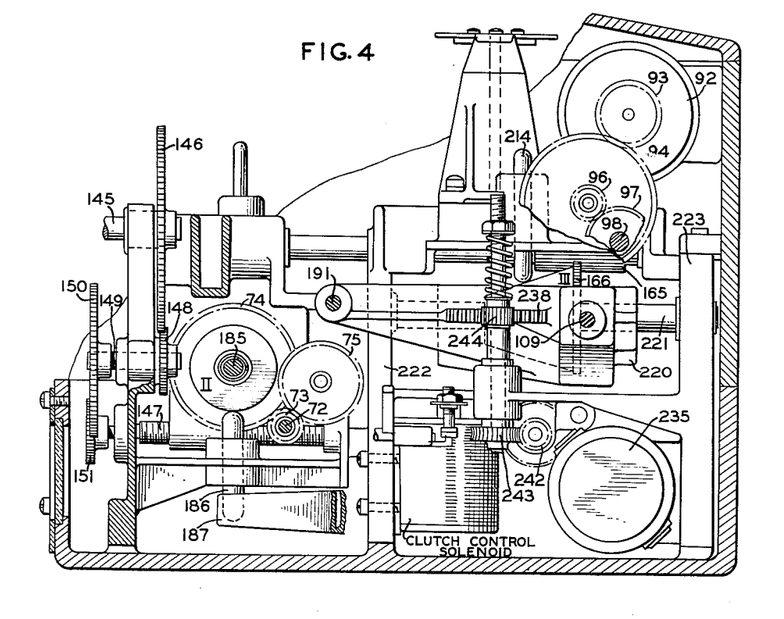
Fig. 4 is a vertical section taken through 4—4 of Fig. 2.

Gear 146' on shaft 145, Figs. 1, 3 and 4, turns a lead screw 147 by means of gear 148, shaft 149, gears 150 and 151.

The lead screw translates ballistic cam I by means of fork 152 which engages a flange at the end of the cam. The cam is moved in rotation by long pinion 33 driven from the azimuth input mechanism as already mentioned.

The group of gears and shafts just described are assembled as a single unit in a casting 153 provided with suitable bearings for the shafts.

Pinion 33 turns gear 155 on shaft 156 carrying gun azimuth dial 157 which may be seen through a window in the front of the sight casing.

Target dimension adjustment disc 130, by means of gears 158 and 159, turns a shaft 160, Figs. 1 and 2, carrying a target dimension dial 161 in order to position the dial with respect to lubber line 141. The dial graduations give target dimensions directly on a logarithmic scale.

Shaft 160 is used also to rotate a three-dimensional range cam III. The shaft carries a gear 162 meshing with a gear 163 on shaft 164, shown as a broken shaft in Fig. 1 extending to the gear of the mechanism where it supports a long pinion 165 in mesh with a gear 166 formed on range cam III, which will be described further on.

The ballistic correction computing mechanism which includes three-dimensional cams I and II solves the ballistic corrections in elevation and azimuth. The output of the ballistic mechanism is a displacement proportional to the ballistic correction per unit of time of flight, for example, angular mils per second of time of flight.

Ballistic cam I is mounted for translation on a shaft 170, Fig. 3, supported in bearings in castings 171 and 172. The lift pin 173 for the cam is mounted underneath the cam in a bearing formed in a web connecting the castings just mentioned. The pin engages one end of a lever 174 of a differential adding linkage, the other end of the lever being operated by pin 125 of unit 79 as already described.

Lever 174 is pivoted to the lower end of a vertical rod 175 arranged to reciprocate in a bearing in casting 172. The rod is urged upward by spring 176 whereby the ends of lever 174 are kept in contact with lift pin 173 and pin 125.

The upper end of rod 175 is attached by pivot 177 to a lever 178 which has a shiftable fulcrum 179 formed by stud carried by an extension of the movable framework supporting the range cam.

The free end of lever 178 engages a vertical rod 180 supported for endwise movement in a bearing in a casting 181 which supports an assembly of members for adjusting the sight optics. Rod 180 adjusts the lateral deflecting mirror of the sight.

The ballistic mechanism is preferably proportioned to compute ballistic correction on the basis of the following equations representing ballistic deflections, derived from a study of ballistic tables.

(1) $LBD = K_1 \times f(alt) \times f(IAS) \times t_f \times \sin GA$
(2) $VBD = K_1 \times f(alt) \times f(IAS) \times t_f \times \cos GA \sin GE - K_2 \times t_f \times \cos GE$ where LBD = lateral ballistic deflection
VBD = vertical ballistic deflection
$K_1$ = basic constant deflection when altitude is 40,000 ft., IAS is 100 M. P. H., $t_f$ is 1 sec. and sin GA is 1.
$f(alt)$ = altitude factor which is a funtion of altitude
$f(IAS)$ = indicated air speed factor which is a function of IAS.
$t_f$ = time of flight of the bullet and is a function of range and altitude.
$K_2$ = basic gravity deflection constant when $t_f$ is 1 sec. and cos $GE = 1$.
GA = gun azimuth angle.
GE = gun elevation angle.

The azimuth ballistic cam I solves Equation 1 as follows:

The cam is translated by the IAS knob rotation and rotated by the gun azimuth angle (GA) input. Rotation of the IAS knob 131 is setting IAS graduation against altitude lubber 136 which has previously been set to altitude represents:

$$\log f(alt) + \log f(IAS)$$

which is similar to multiplying by the slide rule method. Cam I is made to a logarithmic curve in translation designed to de-log the above function. The cam is designed to give $K_1$ sine gun azimuth angle (GA) in rotation. The resultant lift of the cam pin 173 gives $$K_1 \times f(alt) \times f(IAS) \times \sin GA = \frac{LBD}{t_f}$$

The movement of the cam pin 173 effects a corresponding displacement of lever 174 of the adding linkage already described.

Ballistic cam II, Figs. 1 and 4, is translated by lift pin 185 which is operated by cam I. Lift pin 185 is located 90° away from the other lift pin 173 of cam I, and, accordingly, the translation of cam II is similar to that of lift pin 173 except that sin GA is changed by the location of pin 185 to cos GA. The cam is rotated by the gun elevation input mechanism as already described.

Lift pin 186 operated by cam II is disposed underneath the cam, and the lower end thereof engages one end of lever 187 of a differential adding linkage, whose opposite end is engaged by pin 125 of unit 80. The mechanism connected with this lever is similar to that of lever 174. The lever is pivoted to a rod 188 supported for vertical endwise movement. The upper end of the rod is pivoted at 189 to lever 190 having a fulcrum 191 comprising a stud carried by an extension of the movable frame supporting the range cam. Lever 190 operates a rod 192 that controls the optics of the sight to deflect the line of sight in elevation.

Cam II solves Equation 2 as follows: The cam is translated according to $$K_1 \times f(alt) \times f(IAS) \times \cos GA = \frac{LBD \times \cos GA}{t_f \times \sin GA}$$

and is rotated in proportion to the gun elevation angle (GE). The cam is designed to give lifts proportional to (the product of its translation and sin $GE$) $-(K_2 \times \cos GE)$.

The resultant lift of the pin of cam II gives $$K_1 \times f(alt) \times f(IAS) \times \cos GA \times$$
$$\sin GE - K_2 \times \cos GE = \frac{VBD}{t_f}$$

Range cam III is closely associated with the optical system of the sight, so in order to give a clearer understanding of the range cam, the optical system will be described next. The optical system, Fig. 1, is of a known kind consisting of a lamp 200, a reticle 201, a stationary mirror 202 which reflects beams of light shaped by the reticle onto a lateral deflection mirror 203 which further deflects the rays of light onto a slanting transparent mirror 204 disposed in the line of sight whereby the image of the reticle is superimposed on the target viewed through the transparent mirror 204. A suitable lens 205 is disposed between the reticle and mirror 202 to focus the reticle light into a parallel beam thereon.

Mirror 203 is secured to a shaft 206 to which is fastened an arm 207 engaged by the upper end of rod 180 which maintains the mirror at the proper lateral deflection angle.

Similarly, transparent mirror 204 is mounted on a shaft 208 having an arm 209 fastened thereto engaged by vertical rod 192, the movement of the rod maintaining the mirror positioned so as to deflect the line of sight according to the vertical deflection angle.

Figure 7:
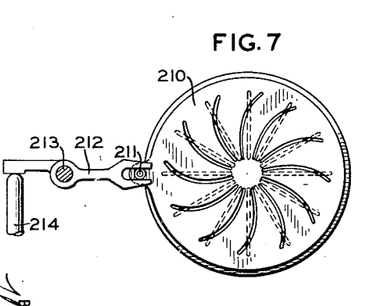
Fig. 7 shows the variable size reticle mechanism on an enlarged scale.

The reticle of the present sight, Fig. 7, comprises two discs, one of which is stationary and the other movable. In the present instance the stationary disc is provided with a number of radial slots while the movable disc has cooperating slots in the form of logarithmic spirals. These discs act as a light gate allowing light to pass through the small rhombi of intersection of radial and spiral slots. The image of these rhombi 205 is focussed by lens 205 of the optical system so they appear on the combining glass 204 as a circle whose circumference is formed by small diamond-shaped beams of light.

The movable plate 210 of the reticle is connected by pin 211 to one arm of a lever 212 pivoted at 213. The opposite end of the lever is actuated by lift pin 214 of range cam III.

It will be understood that when the two discs of the reticle are moved with respect to each other, the diameter of the circle of light rays projected through the intersecting slots will vary accordingly. In sighting operations with a sight of this kind, the reticle is adjusted so that it just encloses the target or a part thereof of known dimension, and by so adjusting the reticle, after the target dimensions have been set into the sight, an accurate measure of range is automatically set into the sight mechanism.

In the present embodiment of the invention, the range cam is utilized to adjust the size of the reticle. The range cam is positioned in one dimension according to a time of flight function as will be described in detail.

The range cam III is mounted for rotation within a framework 220, Figs. 2 and 4. Both the framework and the cam are supported for translation on a shaft 221, held between upright members 222 and 223 of a casting supporting the assembly. The cam is spaced from the ends of framework 220 by sleeves 224 and 225. A yoke 226, projecting from one side of the framework 220, Fig. 1, whose arms slide on opposite sides of shaft 164 keeps the framework from turning on its supporting shaft.

Symmetrically disposed on the framework are four legs 227, 228, 229 and 230, best shown in Fig. 2. Each leg carries a stud already mentioned, which serves as a movable fulcrum for one of the levers of the intermediate mechanism. Stud 179 on leg 227 is the fulcrum for lever 178, Fig. 3; stud 191 on leg 229 is the fulcrum for lever 190; and a stud 109 on each of the legs 228 and 230 are the fulcrums for levers 118 of variable speed units 79 and 80, respectively.

The range cam has already been described as being rotated by long pinion 165 operated by knurled target dimension disc 130 at the front of the sight casing.

The range cam and its enclosing frame are translated by a range motor 235, Fig. 1. The range is controlled in the known manner by a suitable circuit controlling device capable of causing the motor to start, stop and turn in either direction. A controlling device is indicated as a button located adjacent to a sight handle 237. It will be understood that this device may be of any suitable kind and disposed for foot operation, if so desired. The range motor shaft operates a rack 238 formed integrally with the frame of the range cam through a train of reduction gears consisting of gear 239 on the motor shaft, idler gear 240, gear 241, worm 242, worm gear 243 and gear 244, the latter being in mesh with rack 238. As the range decreases, the range cam, as shown in Fig. 1, is translated toward the left of the drawing, increasing the elevation of the lift pin which effects a corresponding increase in the diameter of the reticle. A dial 232 mounted on shaft 233 driven by gear 234 and a rack on the side of the cam framework provides a range indicator which may be observed from the top of the sight casing.

Figure 11:
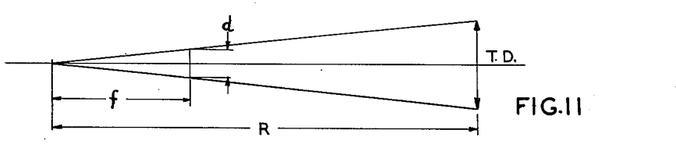
Figs. 11, 12, 13 and 14 are diagrams illustrating, respectively, the range finder, multiplying linkage, azimuth input mechanism, and adding linkage.

The range mechanism solves range by triangulation in the known manner as illustrated by the diagram shown in Fig. 11, where $$R = \frac{TD}{d} \times f$$

where $f$=the focal length of lens
$d$=reticle diameter
TD=target dimension
R=present range The range cam is translated in order to adjust the reticle diameter $d$ so that the above equation is satisfied. For a given rotation of cam III, $d$ is inversely proportional to range. The cam solves an equation of $t_f$ as a function of range as will be described. The translation of the cam required to position the reticle represents a function of $t_f$. The cam is designed to de-log the TD input in rotation.

*The time of flight correction for altitude*

As altitude increases, air density decreases, the less dense air offering less resistance to the projectiles. Therefore it is desirable that the time of flight be corrected for altitude.

Time of flight is given empirically by $$t_f = .109(R/100) + .00192(R/100)^2 + .0000106(R/100)^3$$

at an altitude of 18,350 ft. density ratio=.5732. Time of flight may be given approximately for any altitude by using a false range $R_0$ which is given by $$R_0 = F_{t_f}(alt) \times R$$

where $F_{t_f}(alt)$ is a time of flight factor of altitude and is a function of $f(alt)$, the altitude factor used for the altitude dial graduations. The $F_{t_f}(alt)$ is introduced by a linkage connecting the altitude lubber line to the TD lubber line as a logarithmic function. The altitude lubber setting gives $\log f(alt)$. The linkage is designed to position the TD lubber as $\log F_{t_f}(alt)$. The TD dial is graduated as log TD. The altitude setting positions the TD lubber as $\log F_{t_f}(alt)$. When the TD dial setting is made the rotation thereof represents $$\log TD + \log F_{t_f}(alt)$$

according to the slide rule method of multiplication. The range cam is designed to de-log the rotation input. Upon de-logging, the input function to the cam represents.

$$F_{t_f}(alt) \times TD$$

Using this value of false TD in the solving for false range $$R_0 = F_{t_f}(alt) \times \frac{TD}{d} \times f = F_{t_f}(alt) \times R$$

which is the false range desired. The resultant solution of the $t_f$ equation in range by the translation of the range cam gives $t_f$ corrected for any altitude.

In other words, the false target dimension results in the range cam being translated a correspondingly greater or lesser distance to bracket the target to give a time of flight corrected for altitude which appears in the positions of the fulcrums 109 attached to the framework supporting the range cam. This arrangement is believed to be new.

The prediction solution of the sight is obtained by equating the gun rate with the variable speed drives and their associated differentials.

Figure 12:
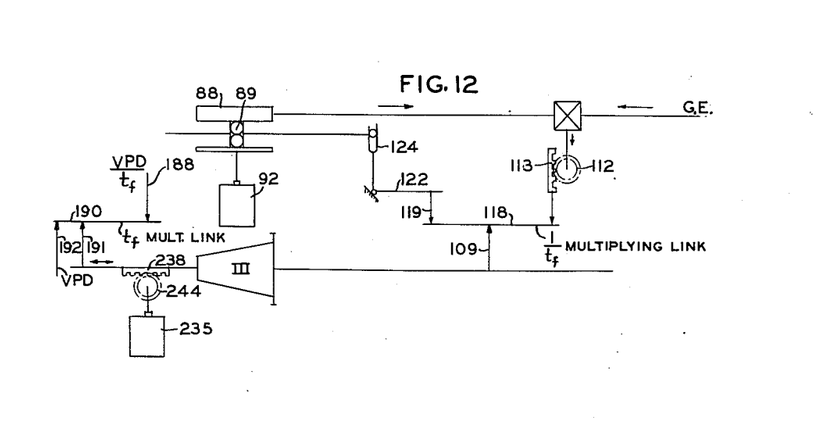
Figure 13:
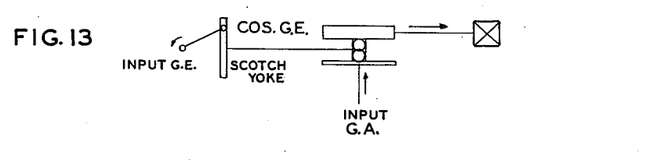

Figures 12 and 13 are diagrams which illustrate respectively the operation of the elevation and azimuth prediction mechanism.

The desired prediction solution is given by the differential equations $$\frac{d}{dt}(VPD) + \frac{K}{t_f}(VPD) = \frac{dGE}{dt}$$

$$\frac{d}{dt}(LPD) + \frac{K}{t_f}(LPD) = \cos GE \frac{dGA}{dt}$$

where VPD is vertical prediction deflection and LPD is lateral prediction deflection.

In the azimuth prediction mechanism the input to the aquating differential is $$\cos GE \frac{dGA}{dt}$$

since cos GE is introduced by Scotch yoke 42 which is displaced from the elevation input mechanism.

The solution for LPD is the same as for VPD with $$\frac{dGE}{dt}$$

replaced by $$\cos GE \frac{dGA}{dt}$$

The variable fulcrum 109 is displaced with the range cam according to $t_f$, the lever connections being such as to cause the bellcrank arrangement 122—124 to be rocked by multiplying lever 118 in inverse proportion to the time of flight. The ball carriage displacement accordingly is inversely proportional to the time of flight, while the movement of pin 125 represents the prediction rate $$\frac{LPD}{t_f}$$

The displacement of the lift pin 173 of cam I represents $$\frac{LBD}{t_f}$$

or the lateral ballistic correction per unit of time and, as already stated, that of pin 125 represents $$\frac{LBD}{t_f}$$

Figure 14:
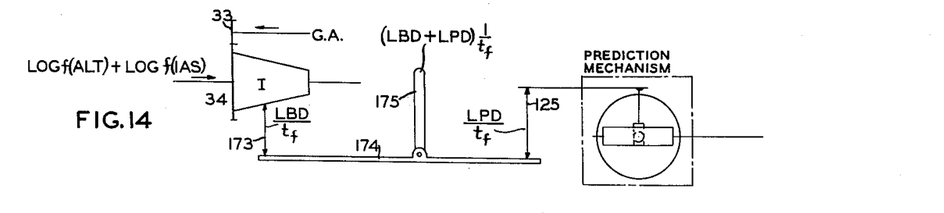

The displacements of the pins are added by lever 174, as shown in the diagram of Fig. 14, their sum appearing as the resulting displacement of the vertical fulcrum pin 175 on which lever 174 is pivoted. In the same way $$\frac{VBD}{t_f}$$

is added to $$\frac{VPD}{t_f}$$

their sum appearing as a displacement of vertical rod 188 to the end of which lever 187 is pivoted.

The output of the adding links gives the total lateral or vertical deflections in angular mils per second. In order to obtain the total lateral deflection and the total vertical deflections, these deflections are multiplied by $t_f$ by means of a second multiplying lever arrangement whose connections are such as to cause the displacement of vertical fulcrum pins 188 or 175 to be multiplied directly by $t_t$ thereby obtaining the desired total deflection. In Fig. 12, vertical fulcrum pin 188 of adding link 187 is shown as engaging one end of lever 190. The movable fulcrum 191 is attached to the range cam framework causes the lever movement to be multiplied directly by time of flight whereby the opposite end of the lever is displaced according to the desired deflection, which is shown as vertical prediction deflection. The arrangement just described wherein the ballistic and prediction functions are first added and then multiplied by time of flight is believed to be novel and results in a considerably simplified mechanism.

The computing sight as described above computes the deflections required for a projectile to strike a target flying along a straight course. If the bomber on which the sight is installed is attacked by pursuit planes with fixed guns, the attacking craft must fly ahead on curved course which has come to be known as a pursuit curve. Ring 135 which carries lubber line 136 is provided with an additional "attack" lubber line 136' so positioned on the ring that when used as a reference, instead of lubber line 136, the time of flight is corrected to apply a correction to the total displacement of the line of sight to compensate for the angular deviation of the pursuit curve.

An important feature of the present invention is that the sight is effective for elevation angles, plus or minus 90° and for 360° in azimuth and therefor may be installed in any gun position of a bomber without alteration of the computing mechanism.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a computing gun sight, means for computing a ballistic deflection per unit of time of flight, means for computing the prediction deflection per unit of time of flight, a differential mechanism comprising a lever having a yielding fulcrum, the ends of the lever being disposed so as to be displaced by the respective means in proportion to their computations whereby the fulcrum is displaced according to the sum of said computations.

2. In a computing gun sight, means for computing a ballistic deflection per unit of time of flight, means for computing the prediction deflection per unit of time of flight, an adding mechanism comprising a lever having a yielding fulcrum, the ends of the lever being disposed so as to be displaced by the respective means in proportion to their computations, the resulting fulcrum displacement being proportional to the sum of said computations, time of flight multiplying means actuated by said fulcrum in proportion to the displacement thereof, the resulting product being a displacement proportional to total deflection.

3. In a computing gun sight, means for computing the elevation ballistic deflection angle per unit of time of flight, means for computing the elevation prediction deflection per unit of time of flight, an adding mechanism comprising a lever having a yielding fulcrum, the ends of the lever being disposed for displacement by the respective means in accordance with their computations, the resulting fulcrum displacement being proportional to the total vertical deffection rate, time of flight multiplying means actuated by said fulcrum in proportion to the displacement thereof, the resulting product being a displacement proportional to total vertical deflection.

4. In a computing gun sight, means for computing the azimuth ballistic deflection per unit of time of flight, means for computing the azimuth deflection per unit of time of flight, an adding mechanism comprising a lever having a yielding fulcrum, the ends of the lever being disposed for displacement by the respective means in accordance with their computations, the resulting fulcrum displacement being proportional to the total lateral deflection rate, time of flight multiplying means actuated by said fulcrum in proportion to the displacement thereof, the resulting product being a displacement proportional to total lateral deflection.

5. In a computing gun sight, means for computing ballistic deflection per unit of time of flight, means for computing the prediction deflection per unit of time of flight, an adding mechanism having separate inputs individually actuated by the respective means in accordance with their computations, an output member for the adding mechanism, a time of flight multiplying device actuated by the output member, the product obtained thereby being proportional to total deflection, and line of sight defining means deflected by said multiplying device in accordance with said product.

6. In a computing gun sight, means for computing ballistic deflection per unit of time of flight, means for computing the prediction deflection per unit of time of flight, a differential linkage mechanism having separate inputs individually actuated by the respective means in accordance with their computations, an output member for the differential having a displacement proportional to the sum of said computations, a lever having one end actuated by said differential linkage mechanism, a fulcrum therefor movable according to a function of time of flight whereby the opposite end of the lever is displaced according to total deflection.

7. In a computing gun sight, means for computing ballistic deflection per unit of time of flight, means for computing the prediction deflection per unit of time of flight, a lever disposed on a pivoted fulcrum adapted to be displaced by movements imparted to the lever, means for displacing the ends of the lever by the respective means in proportion to their computations whereby the fulcrum is displaced in accordance with the sum of said computations, a multiplying lever, a fulcrum therefor displaced according to a function of time of flight, said multiplying lever being disposed so that one end thereof is displaced by the first mentioned fulcrum whereby the opposite end of the lever is displaced according to total deflection, line of sight defining means, and a member engaged by the last-mentioned lever for offsetting the line of sight defined by said means according to total deflection.

8. In a computing gun sight, a pair of levers, means for actuating an arm of one of the levers in accordance with the sum of the azimuth ballistic and prediction deflections per unit time of flight, means for actuating the corresponding arm of the other lever in accordance with the sum of the elevation ballistic and prediction deflections per unit time of flight, means for multiplying said sums respectively by the time of flight to effect displacement of the opposite arms of the levers respectively in accordance with total azimuth and elevation deflections comprising movable fulcrums for the levers both displaced in accordance with time of flight, line of sight defining means having azimuth and elevation line of sight deflecting members, and means for actuating said members respectively by corresponding ones of said opposite arms of the levers.

FLOYD A. LYON.

REFERENCES CITED

The following references are of record in the file of this patent:

UNITED STATES PATENTS

| Number | Name | Date |
| --- | --- | --- |
| 1,460,221 | Barr et al. | June 26, 1923 |
| 1,481,248 | Sperry | Jan. 15, 1924 |
| 1,730,290 | Petschenig et al. | Oct. 1, 1929 |
| 1,990,577 | Watson | Feb. 12, 1935 |
| 2,012,960 | Coupland | Sept. 3, 1935 |
| 2,065,303 | Chafee et al. | Dec. 22, 1936 |
| 2,125,225 | Gourdou | July 26, 1938 |
| 2,160,202 | Fieux | May 30, 1939 |
| 2,164,463 | Mather | July 4, 1939 |
| 2,189,964 | Sealey | Feb. 13, 1940 |
| 2,206,875 | Chafee et al. | July 9, 1940 |
| 2,311,187 | Murtagn | Feb. 16, 1943 |
| 2,403,117 | Peters | July 2, 1946 |
| 2,433,843 | Hammond et al. | Jan. 6, 1948 |